United States Patent [19]

Tyler

[11] Patent Number: 5,227,819
[45] Date of Patent: Jul. 13, 1993

[54] FILM MAGAZINE FOR MOTION PICTURE CAMERA

[76] Inventor: Nelson Tyler, 15801 Royal Oak Rd., Encino, Calif. 90436

[21] Appl. No.: 904,980

[22] Filed: Jun. 26, 1992

[51] Int. Cl.⁵ .............................................. G03B 23/02
[52] U.S. Cl. ...................... 352/78 R; 352/75; 352/156
[58] Field of Search .............. 352/75, 76, 78, 156; 242/194

[56] References Cited

U.S. PATENT DOCUMENTS 2,476,705  7/1949  Coutant et al. .
4,365,876  12/1982  Campbell .
4,630,907  12/1986  Mayer .
4,826,310  5/1989  Goodman ........................ 352/78 R Primary Examiner—Monroe H. Hayes
Attorney, Agent, or Firm—Joseph F. McLellan

[57] ABSTRACT

A film magazine having a case adapted to be mounted in fixed position adjacent a motion picture camera that is adjustably movable along a fore and aft axis. The magazine includes a film slot and a film guide assembly movable along the length of the film slot for guiding the film in light tight relation through the film slot regardless of the position of the camera. The arrangement does not require rethreading of the film following each change in camera position.

16 Claims, 4 Drawing Sheets

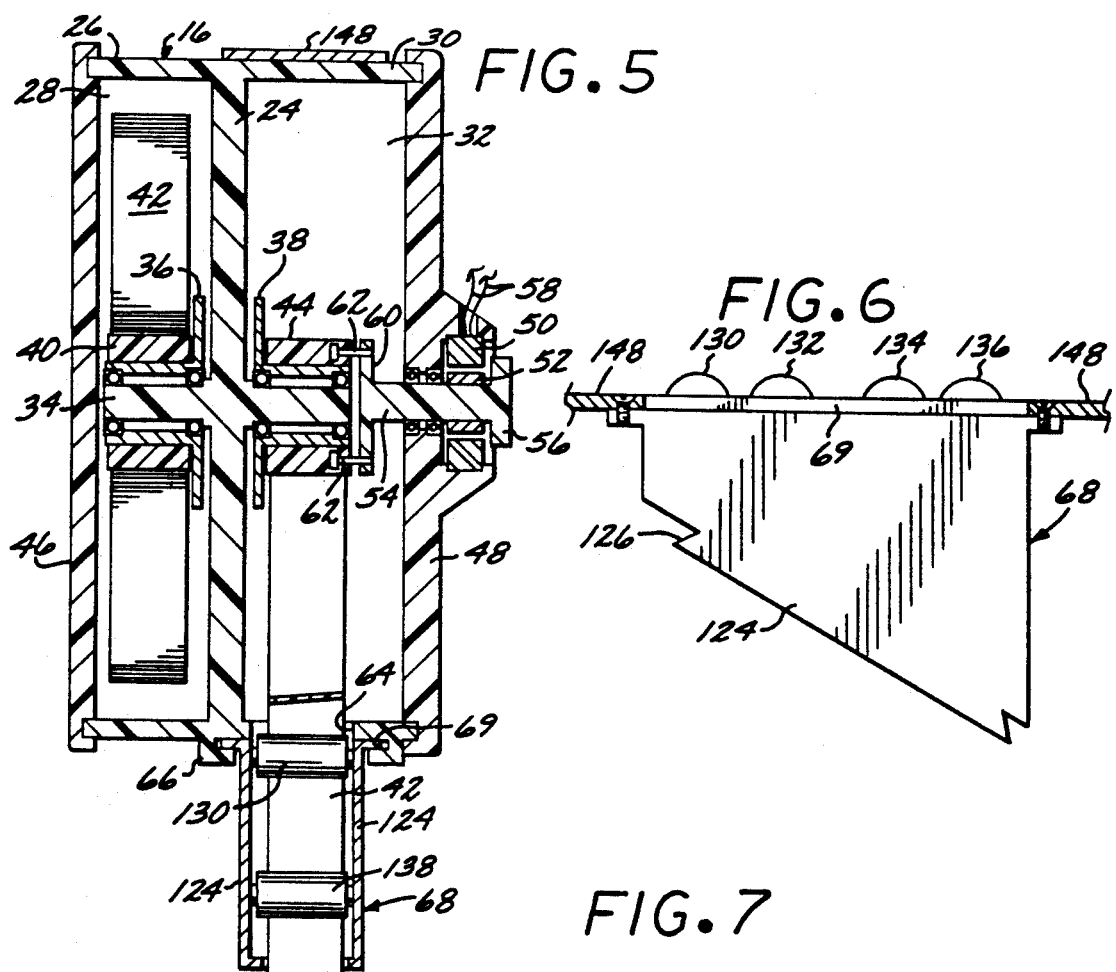

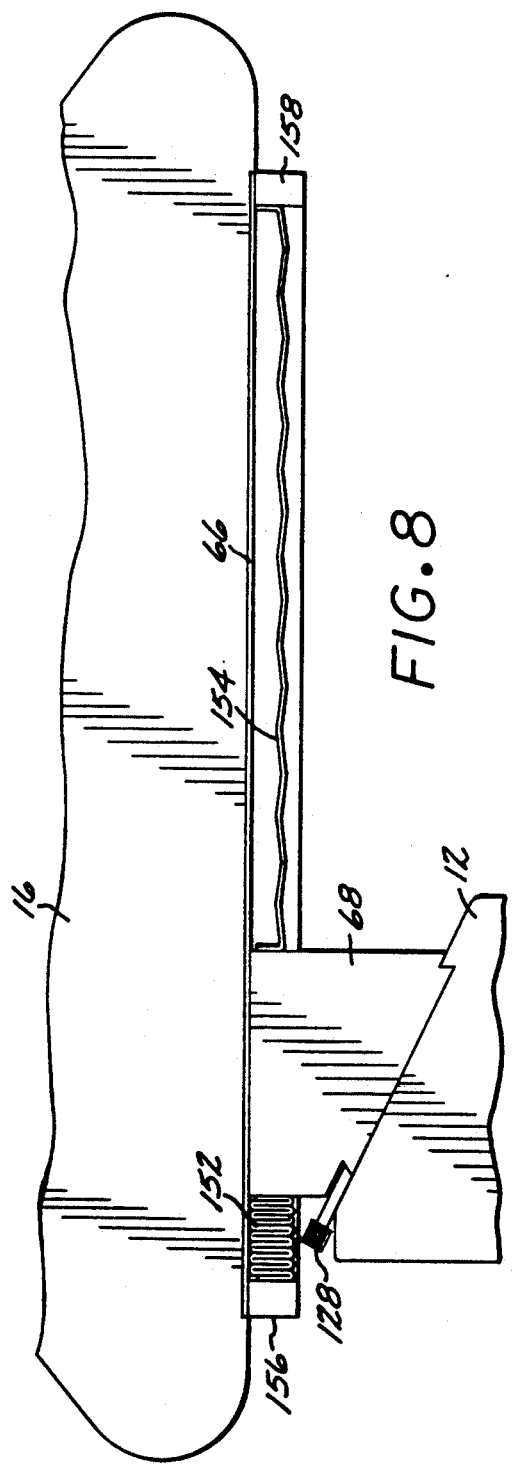
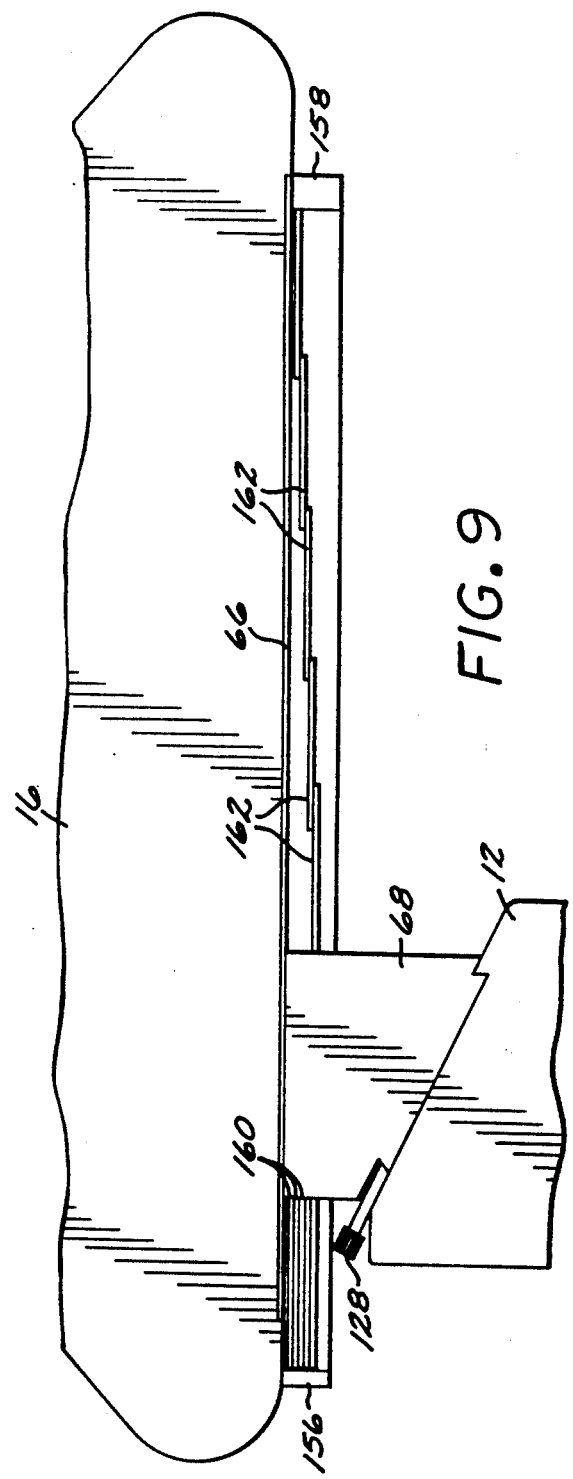

FILM MAGAZINE FOR MOTION PICTURE CAMERA

BACKGROUND OF THE INVENTION

1. Field of the Invention

The invention relates to a film magazine, and more particularly to a motion picture camera film magazine which can accommodate movement of the camera without thereafter having to rethread the film.

2. Description of the Prior Art

Normally a camera is fixed to the film magazine with which it is associated. Consequently the camera can be moved without affecting the threading of the film in the camera. However, in certain installations the magazine is fixed in position and it is necessary on occasion to move the camera relative to the magazine.

For example, when filming is done from an aircraft, the film magazine and the camera and its associated lens are often mounted in a spherical housing to protect them from wind or rapid air movement damage. The size of the housing is made as small as possible to minimize air drag and stress on the aircraft.

One such installation is described in my copending patent application Ser. No. 07/794,000 filed Nov. 18, 1991, and entitled "Gyroscopically Stabilized Apparatus". A motion picture camera is supported upon a platform which is fixed to an internal wall of a spherical housing adapted to be mounted to a helicopter. A film magazine is mounted on top of the camera, with the feed and take up reels in longitudinal alignment.

An opening or window is provided in the housing adjacent the camera lens, and the lens is located as close to this window as possible to provide wide angle coverage of the target object. A zoom or variable focal length lens is generally used, and its comparatively long length necessitates placement of the camera at the rear of the housing.

Sometimes it is desirable in a filming sequence to use a shorter, fixed focal length lens. In the prior art this was done by installing a series of spacers between the magazine and the camera to locate the shorter lens closer to the housing window. This is a painstaking operation which takes time, and it also requires rethreading of the film in the new camera position. Alternatively, the housing could be made large enough to allow both the magazine and the camera to be moved back and forth without affecting the film threading but, as previously indicated, this would undesirably increase the size of the housing and its frontal area, and impose a correspondingly increased stress on the aircraft.

In gyroscopically stabilized camera systems such as that disclosed in my copending patent application, it is important that the weight of the various components be balanced about the various axes of pivotal movement. Relatively complex means have been used to compensate for the change in weight balance occasioned when film passes from the supply reel of a magazine to an in-line or longitudinally aligned take up reel. Typically, a small weight was provided and its position incrementally changed according to the weight imbalance.

Another weight compensation arrangement is disclosed in U.S. Pat. No. 4,826,310 issued May 2, 1989 for "Constant Center of Gravity Film Camera Magazine". The disclosed system includes feed and take up spindles mounted on a carriage whose position is changed to the extent necessary to maintain a fixed center of gravity for the magazine during movement of film between the spindles. Movement of the carriages introduces a considerable degree of complexity to the arrangement.

Certain prior art arrangement of a camera and a magazine within a housing are also wasteful of space because the feed and take up reels are lined up behind one another. Such an arrangement limits the diameter and film capacity of the reels because they have to fit between the front and rear of the protective housing. Side-by-side reels and means for laterally feeding film between the reels is known, but suitable arrangements enclosed within a protective spherical housing of the type mentioned above are not available.

SUMMARY OF THE INVENTION

According to the present invention, a film magazine is provided which utilizes tandem or side-by-side feed and take up reels to enable larger reels to be used in a given housing space. An axially movable weight compensates for film weight shift along the axis of rotation of the reels.

The film magazine includes a casing having an elongated film slot and also a film guide means or assembly which guides film through the slot for travel between the casing and the camera. The film guide assembly is movable relative to the magazine, and it is adapted for mounting to the camera for movement with the camera along the length of the slot.

The film magazine further includes light tight means coupled between the film assembly and the casing, and overlying the film slot in the various adjusted positions of the camera to shield the film from light.

The magazine includes a central wall dividing the casing into adjacent feed and take up reel compartments. The wall is provided with a crossover opening. Film threading rollers in the compartments guide film from the feed reel compartment through the crossover opening and into the take up reel compartment. The magazine preferably includes a film magazine door having an integral drive means engageable with the take up reel when the door is placed in position to close the take up reel compartment.

In one embodiment the film magazine includes includes elongated support structure extending along the length of the film slot, and the light tight means comprises a slot cover slidable carried by the support structure. In another embodiment the light tight means comprises an arrangement of slidable plates which slide over one another, being extensible and retractable, respectively, on opposite sides of the film guide assembly to accommodate longitudinal movement of the assembly. In yet another embodiment the light tight means comprises a bellows arrangement in which bellows on one side of the film guide assembly expand, while bellows on the other side of the film guide assembly collapse.

In all of the embodiments the fore and aft or longitudinal position of the camera can be adjusted along the length of the film magazine, even though film is threaded between the camera and the film magazine. The threading of the film over the film guide rollers is unaffected, and a light tight relation is maintained at all times.

Other aspects and advantages of the present invention will become apparent from the following more detailed description taken in conjunction with the accompanying drawings.

BRIEF DESCRIPTION OF THE DRAWINGS

FIG. 5 is an enlarged view taken along the line 5—5 of FIG. 2;

FIG. 6 is a detail left side elevational view of the film guide assembly;

FIG. 7 is a view similar to FIG. 2, but illustrating a shorter focal length lens arrangement necessitating location of the camera in a different position;

FIG. 8 is a partial left side elevational view of adjacent portions of the film magazine, the film guide assembly and the camera, and illustrating a bellows embodiment of the light tight covering over the magazine film slot; and FIG. 9 is a view similar to FIG. 8, but illustrating a stacked plate embodiment of the light tight covering over the magazine film slot.

DESCRIPTION OF THE PREFERRED EMBODIMENTS

As previously indicated, the present film magazine is particularly useful in combination with a gyroscopically stabilized camera system carried by an aircraft such as a helicopter. Accordingly, the following description applies to such an application. However, it will be appreciated that the described application should not be considered as limiting since the film magazine can be used in many other situations in which it is desirable to provide a capability for camera movement relative to a fixed magazine, without necessitating rethreading of the film through the camera following such movement.

The gyroscopically stabilized camera system hereinafter discussed is more particularly described in my copending patent application Ser. No. 07/794,000, as mentioned above.

Figures 1, 4:
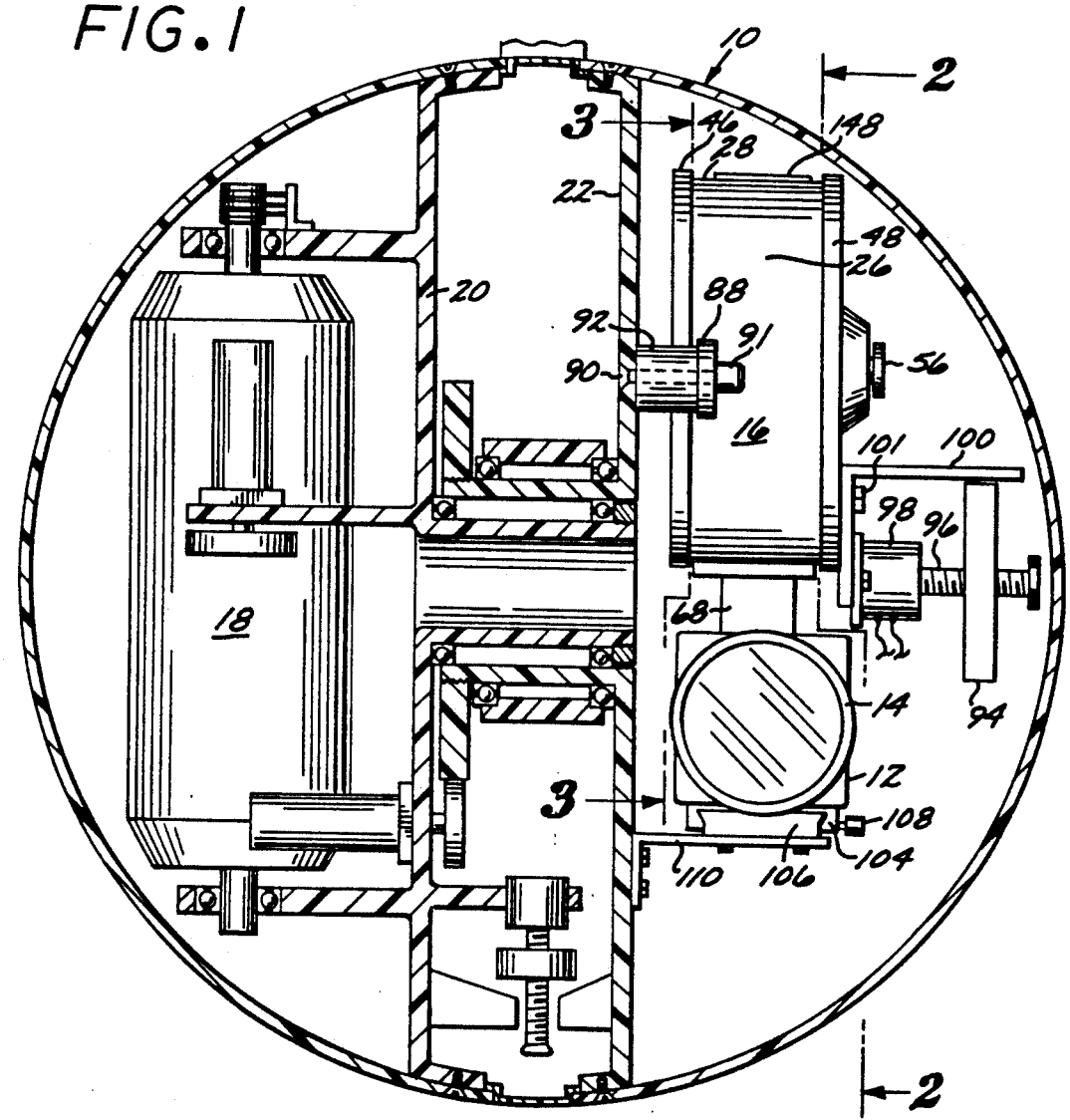
FIG. 1 is transverse cross sectional view of a gyroscopically stabilized camera system mounted in a spherical protective housing, and incorporating the improved film magazine of the present invention.
FIG. 4 is a view of the film magazine as seen in FIG. 3, but showing the complete cover for the crossover opening.

Referring now to FIGS. 1-7, and particularly to FIG. 1, the exemplary gyroscopically stabilized camera system which is illustrated comprises an aerodynamic drag reducing spherical fairing or housing 10. The housing encloses a camera 12 and its adjustable focus or zoom lens 14, a generally triangularly shaped film magazine 16, and also the gyro stabilizing mechanism, which is generally designated by the numeral 18.

The housing 10 is made in two hemispherical portions having walls 20 and 22 which respectively mount the stabilizing mechanism 18, and the film magazine 16 and camera 12. The operation of the stabilizing mechanism 18 is more particularly described in my copending patent application and therefore a detailed description is omitted in this disclosure, particularly since it forms no part of the present invention.

The internal details of the magazine 16 are best seen in FIG. 5. It comprises a central, vertically oriented wall 24 having an integral, generally triangular flange 26 projecting to the left, as seen in the figure, to form a feed reel compartment 28. The wall further has a flange 30 similar to the flange 26 projecting oppositely to form a take up reel compartment 32.

The wall 24 is also integral with a transverse shaft 34 whose opposite ends mount a pair of bearings which rotatably support a feed reel 36 and a take up reel 38. A feed spool 40 of unexposed film 42 is shown loaded onto the reel 36 for travel through the camera 12 and onto a take up spool 44 splined onto the take up reel 38 for rotation therewith.

The feed reel compartment 28 is closed by a generally triangular feed reel side door 46 whose central portion includes a peripheral, generally triangular groove which accepts the triangular edge of the flange 26. Any suitable detachable mounting means (not shown) may be utilized to provide a light tight connection.

The oppositely located take up reel compartment 32 is similarly closed by a triangularly shaped take up reel side door 48. The central portion of the door 48 mounts a conventional direct current torque motor 50 which acts upon a core 52 fixed to a drive shaft 54 adjacent its flanged end 56. The shaft 54 is rotatably mounted to the central portion of the door 48 by roller bearings, as illustrated. Electrical leads 58 are coupled to a suitable electrical source (not shown) for energization of the motor, which is effective to rotate the shaft 54. This also rotates a drive flange 60 which is carried by the inner end of the shaft.

The drive flange 60 includes a plurality of drive sockets which axially slidably receive a corresponding plurality of drive pins 62. With this arrangement the pins 62 automatically engage the drive sockets when the door 48 is mounted to close the take up reel compartment 32. This significantly simplifies the mechanism for rotating the take up reel during operation of the camera system.

For reasons which will become apparent in the description which follows, the horizontal portion or bottom of the magazine 16 includes an elongated, linearly directed film slot 64 adjacent the base of the take up reel compartment 32 and extending substantially the complete length of the magazine bottom. On opposite sides of the slot 64 the magazine includes parallel flanges extending toward each other to form opposite slots defining an elongated adjustment track 66. A film guide assembly 68 includes upper side flanges 69 which are slidably received in the slots of the track 66 so that the assembly can be adjustably positioned along the length of the track 66.

Figure 3:
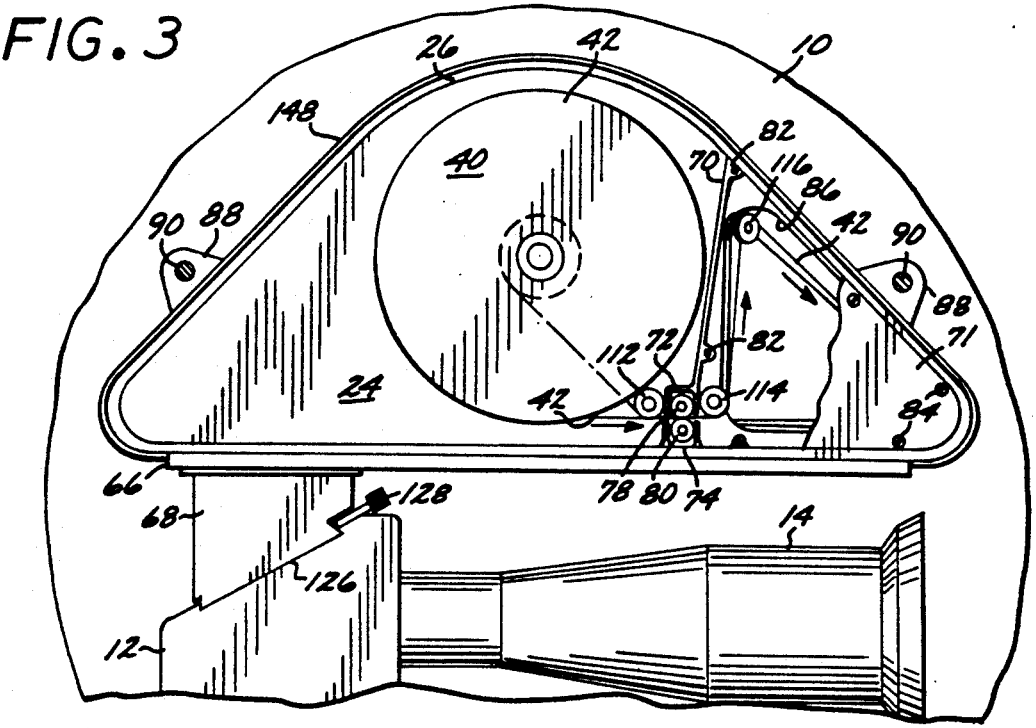
FIG. 3 is a partial right side elevational view taken along the line 3—3 of FIG. 1, a portion of the crossover opening cover being omitted for clarity.

As best seen in FIGS. 3 and 4, the feed reel compartment side of the central magazine wall 24, adjacent the forward or lens end of the compartment, includes a projecting wall or web 70 which, together with the flange 26, provides a seat for a complementally shaped cover 71.

The web 70 extends generally downwardly from a point on the flange 26 located adjacent the upper portion of the feed spool 40. The lower part of the web is configured to provide short, parallel web portions forming a downwardly open, rectangularly shaped light trap 72. Opposite these web portions are similar web portions connected to the flange 26 at the bottom of the magazine, and extending upwardly to form an upwardly opening, rectangularly shaped light trap 74. The traps 72 and 74 are slightly spaced apart to provide a small gap for film 42 to pass through. Felt covered rollers 78 and 80 are mounted to the wall 24 for rotation in the traps 72 and 74, respectively. The web 70 and flange 24 are provided with enlarged portions forming fastener mounts 82. Fasteners 84 pass through the cover 71 and into the mounts 82 to secure the cover 71 in light tight relation to the web 70.

The magazine wall 24 adjacent the cover 71 includes a crossover opening 86 providing communication between the feed and take up reel compartments 28 and 32. As will be seen, film 42 can thus pass from the light tight feed reel compartment, through the opening 86, and into the light tight take up reel compartment, where it can be kept until the film is unloaded in a dark room.

As best seen in FIGS. 1 and 4, the flange 26 of the magazine 16 includes a pair of oppositely located mounting tabs 88. A pair of headed fasteners 90 are carried by the wall 22 of the protective housing 10, pass through a pair of cylindrical standoff spacers 92, and through the tabs 88. Knobs 91 are threaded onto the ends of the fasteners 90 to detachably support the film magazine 16 in position within the housing.

In certain applications it is advantageous to maintain the camera system precisely balanced about all axes. Unless compensated for, a small imbalance develops about the roll axis by reason of movement of the film along the tilt axis from the feed reel compartment 28 to the take up reel compartment 32. Compensation for this can be provided by a square shaped weight 94. The weight includes a central threaded opening to enable the weight to be threaded onto a threaded shaft 96, as seen in FIG. 1.

The shaft 96 is driven by a motor 98 which is energized by connection to a suitable source of power. The motor 98 is mounted on the vertical leg of an L-shaped bracket 100 detachably mounted to the outer face of the take up reel side door 48 by a quick release knob 101. The mounting arrangement aligns the centerline of the weight 94 with the tilt axis of the gyro platform. The horizontal leg of the bracket 100 overlies the weight and prevents the weight from rotating when the shaft 96 is rotated by the motor, instead threadedly moving the weight along the shaft. Of course, any suitable means for mounting the motor 98 and weight 94 in position can be utilized, according to the particular application at hand.

In operation, when the system is operated to move film from one side of the magazine, through the camera, and then to the other side of the magazine, the motor 98 is energized simultaneously with the operation of the camera system to move the weight in the opposite direction and thereby keep the gyro platform in balance.

Figure 2:
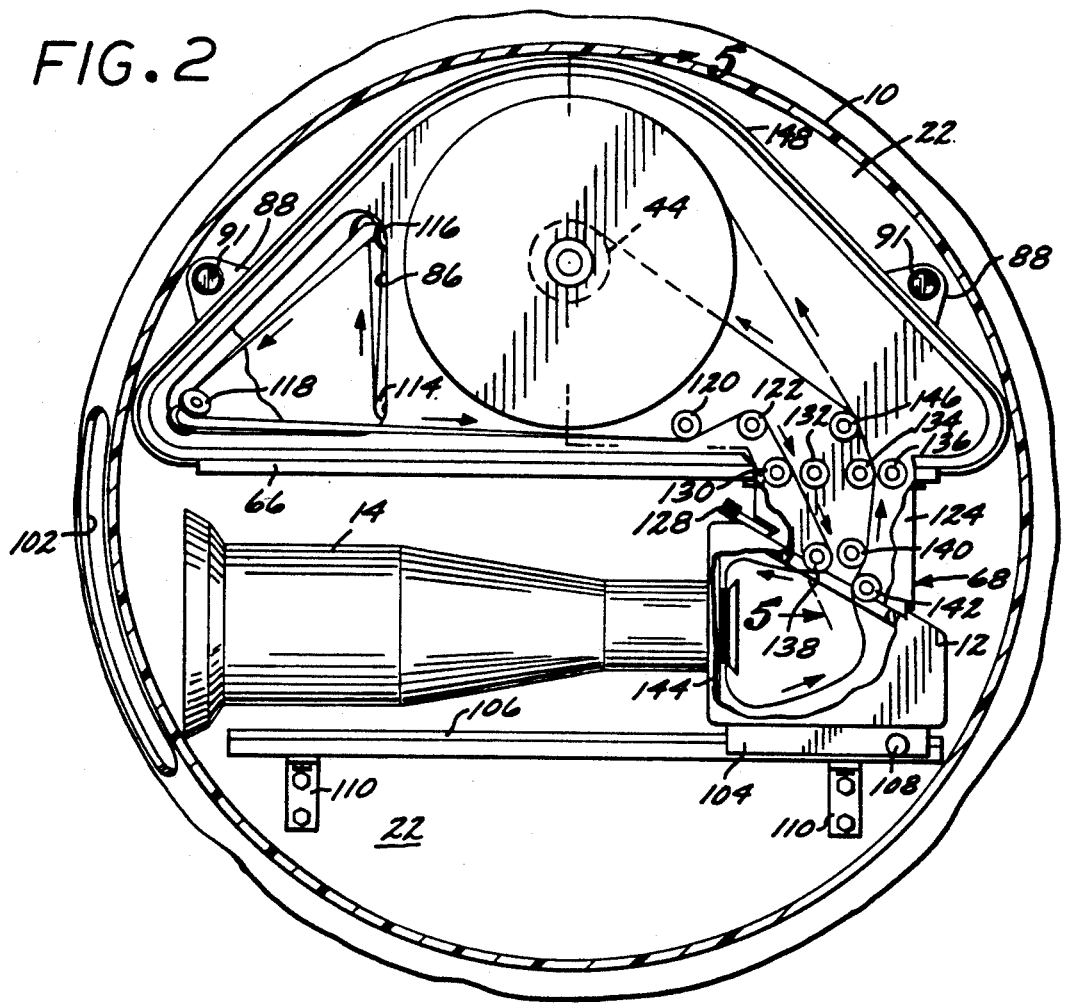
FIG. 2 is a left side elevational view taken along the line 2—2 of FIG. 1.

As seen in FIGS. 1 and 2, the camera 12 supports the zoom lens 14 in position adjacent a window 102 in the housing 10. The bottom of the camera is attached to a base plate 104 by a camera mounting bolt (not shown). The plate 104 is longitudinally slidably movable over a slide rail 106, and a lock screw 108 is operable to fix the rail against movement to thereby lock the camera in any adjusted position. Opposite extremities of the slide rail 106 are secured to the horizontal legs of a pair of support brackets 110 which are attached to the housing wall 22. As will be apparent from the drawings, the position of the plate 104 is thus adjustable along a path parallel to the film slot 64.

With reference to FIG. 3, the means for supporting and threading the film 76 through the film magazine and camera will next be described. Fresh film 42 is drawn off the feed spool 40 and trained about a roller 112 on one side of the light traps 72 and 74. It then passes between the felt covered rollers 78 and 80 and then around a roller 114 on the other side of the light traps. The film next passes around a roller 116 which is cocked or tipped at an angle to direct the film through the crossover opening 86. The rollers shown in FIG. 3 all are rotatably mounted to the feed reel side of the magazine wall 24.

Referring now to FIG. 2, the film coming through the crossover opening 86 passes around a roller 118 which is cocked or tipped at an angle to accept the film from the angled roller 116 on the other side of the magazine wall 24. The film passes from the roller 118 and about rollers 120 and 122 located above the film slot 64 in the bottom of the magazine.

The next set rollers about which the film 24 is trained are carried by the film guide assembly 68. This assembly is a light tight compartment having a flanged top which is open for communication with the film slot 64. The bottom wall of the assembly 68 includes a slot to enable film to pass between the assembly and the interior or the body of the camera 12. The upper flanges of the assembly front and rear walls are attached by screws to a light tight assembly which is associated with the film slot 64, as will subsequently be described. In addition, the laterally outwardly directed upper flanges of the side walls 124 of the film guide assembly 68 are slidable in the opposite grooves of the adjustment track 66, as previously described.

The lower extremities of the end walls and side walls 124 of the assembly 68 are formed into a base 126, as seen in FIG. 6, which fits into a complemental recess formed in the top of the body of the camera 12. As seen in FIG. 7, for example, an element 128 carried by the camera body is spring biased to retract and then wedge against the base 126 once the camera body is fitted into position. The bias acting upon the element 128 is sufficient to fix the camera in position.

Four rollers 130, 132, 134 and 136 are mounted in the upper portion of the hollow interior of the assembly adjacent the film slot 64. Three rollers 138, 140 and 142 are mounted in the lower portion of the assembly adjacent the opening in the camera body.

Film from the roller 121 is trained down and between rollers 130 and 132, between the rollers 138 and 140, through the camera film gate 144, up between the rollers 140 and 142, and up between the rollers 134 and 136, around another roller 146 and onto the take up spool 44.

The rollers 118, 120, 122 and 146 are all rotatably mounted on the take up reel side of the magazine wall 24, while the rollers 130, 132, 134, 136, 138, 140, and 142 are all rotatably mounted upon shafts extending between the side walls 124 of the assembly 668.

From the foregoing it is seen that the provision of the crossover opening 86 provides a unique means for enabling film transfer in a light tight manner between the feed reel and take up reel compartments 28 and 32.

A light tight means or assembly is provided which protects the film from exposure to any light which might otherwise pass through the film slot 64.

In the embodiment illustrated in FIGS. 1-7, the light tight assembly comprises an opaque, elongated band or slot cover 148. One end of the cover 148 is attached by screws to the front of the film guide assembly 68, as best seen in FIG. 6. The slot cover extends forwardly, in overlying relation to the film slot 64, then up and around the periphery of the film magazine, and finally down and forwardly in overlying relation to the rearward portion of the film slot. It is attached by screws to the rearward extremity of the film guide assembly 68. As will be seen, during changes in the longitudinal position of the camera, the cover 148 and the upper flanges of the assembly 68 slide in and along the adjustment track 66, and the remainder of the cover slides over the periphery of the magazine, all in light tight relation.

When the zoom lens 14 is replaced by a shorter, fixed focal length lens 150, as seen in FIG. 7, the camera 12 with the substituted lens 150 must be positioned adjacent the housing window 102. To do this it is slid forwardly along the slide rail 106, after loosening the lock screw 108, and relocked in the more forward position illustrated. As this occurs, the slot cover 148 slides with the camera and the film guide assembly 68 to cover the film slot that would otherwise be exposed. The film threading is not disturbed during this operation, the lengths of the film extending between certain of the rollers simply changing to accommodate this. This is seen in a comparison of the film disposition in FIG. 2 versus that of FIG. 7.

Referring now to FIG. 8, another form of light tight means illustrated, comprising a bellows arrangement in which one bellows 152 is attached to the forward portion of the film guide assembly 68, while a second bellows 154 is attached to the rearward portion of the assembly. The other ends of the bellows 152 and 154 are attached to abutments 156 and 158 attached to the underside of the film magazine at opposite ends of the film slot 64. The bellows 152 and 154 are configured and arranged to expand and collapse according to the direction the assembly 68 is moved along the adjustment track 66, at all times preventing light from passing into the magazine through the film slot 64. Any suitable arrangement can be provided for carrying the edges of the bellows in a light tight slot as bellows expansion and collapse occurs.

FIG. 9 illustrates yet another light tight means, comprising two sets or series of thin plates 160 and 162, each series being suitably edge connected for slidable movement into a stacked relation in advance of the direction of movement of the assembly 68, and into an extended relation on the side of the assembly 68 opposite the direction of its movement. The plate ends remote from the assembly 68 are supported by the abutments 156 and 158 previously described. The plates 160 and 162 are also configured and arranged to maintain a light tight relationship between the plates and the margins of the film slot 64 in all fore and aft positions of the assembly 68, as will be apparent.

Various other modifications and changes may be made with regard to the foregoing detailed description without departing form the spirit of the invention.

We is claimed is:

1. A film magazine comprising:
   a film casing having an elongated, linearly directed film slot;
   film guide means carried by the film casing for guiding film through the film slot for travel between the film casing and a camera whose position is adjustable along a path parallel to the film slot, the film guide means being linearly movable fore and aft relative to the film casing to adjust the position of the film guide means along the length of the film slot; and
   light tight means coupled between the film guide means and the film casing, and overlying the film slot in all fore and aft positions of the film guide means to shield from light film traveling between the film casing and the camera.

2. A film magazine according to claim 1 wherein the film casing includes a central wall dividing the film casing into a film feed compartment and a film take up compartment, the central wall including a crossover opening; and including a plurality of film threading rollers for guiding film from the feed compartment to the the film guide means, and from the film guide means through the crossover opening to the take up compartment.

3. A film magazine according to claim 1 wherein the film casing includes a take up reel rotatable in the take up compartment and a film magazine door having an integral drive means engageable with the take up means upon mounting of the film magazine door to the film casing for driving the take up means.

4. A film magazine according to claim 1 wherein the film guide means includes an opening for communication with the film compartment of a camera, guide roller means for guiding film through the film guide means and into the interior of the camera compartment, and a mounting means for mounting the film guide means in light tight relation to the camera.

5. A film magazine according to claim 1 wherein the film casing includes support means located along the length of the film slot, and the light tight means comprises a slot cover slidably carried by the support means.

6. A film magazine according to claim 5 wherein the support means extends about the periphery of the film casing, and the light tight means extends around the film casing between a forward portion of the film guide means and a rearward portion of the film guide means.

7. A film magazine according to claim 1 wherein the film casing includes support means located along the length of the film slot, and the light tight means comprises a plurality of plates carried by the support means and slidable over one another to accommodate changes in position of the film guide means.

8. A film magazine according to claim 7 wherein first and second series of the plates are located on opposite sides of the film guide means and the first series are slidably retractable into an increasing degree of overlying relation, and the second series are slidably extensible into a decreasing degree of overlying relation upon a change in position of the film guide means along the length of the film slot.

9. A film magazine according to claim 1 wherein the film casing includes support means located along the lengths of the film slot, and the light tight means comprises first and second bellows means located on opposite sides of the film guide means, and the first bellows means are collapsible and the second bellows means are expansible upon a change in position of the film guide means along the length of the film slot.

10. In combination with a camera whose position is adjustable along a predetermined linearly directed path, and having a body provided with mounting means and a film compartment, an improved film magazine comprising:
   a film casing having an elongated, linearly directed film slot parallel to the path of adjustment of the camera:
   film guide means carried by the film casing for guiding film through the film slot for travel between the film casing and the film compartment of the camera, the film guide means including mounting means for connection to the mounting means of the camera, the film guide means being linearly movable fore and aft relative to the film casing, and movable in common with the camera to adjust the position of the film guide means along the length of the film slot; and light tight means coupled between the film guide means and the film casing, and overlaying the film slot in all fore and aft positions of the film guide means to shield from light film traveling between the film casing and the film compartment of the camera.

11. A film magazine comprising:

a film casing having an elongated film slot, means adjacent the slot defining an adjustment track, and first film threading rollers for guiding film;

film guide means having portions longitudinally slidable on the adjustment track along a path parallel to the film slot to adjust the longitudinal position of the film guide means, and further having second film threading rollers for guiding film, the relative longitudinal position of the first and second film threading rollers changing during such movement of the film guide means to accommodate changes in the lengths of the film loops extending between the first and second film threading roller; and light tight means coupled between the film guide means and the film casing and overlaying the film slot in all longitudinal positions of the film guide means to provide a light shield for film traveling between the first and second film threading rollers.

12. A film magazine according to claim 11 wherein the film casing includes a central wall dividing the film casing into a film feed compartment and a film take up compartment, the central wall including a crossover opening; and wherein certain of the first film threading rollers are operative to guide film from the feed compartment through the crossover opening to the take up compartment, and certain others of the first film threading rollers are operative to guide film from the take up compartment to certain of the second film threading rollers for passage through the film slot into a camera body, and certain others of the second film threading rollers are operative to guide film from the camera body through the film slot back to the take up compartment.

13. A film magazine according to claim 11 wherein the film casing includes a take up reel and a side door having a mounted position wherein the side door closes the take up reel compartment, and including a drive motor integral with the side door for driving engagement with the take up reel upon location of the side door in the mounted position.

14. A film magazine according to claim 13 and including weight compensation means comprising a mounting bracket mounted to the side door and having a stop portion; a compensation motor mounted to the bracket and having a threaded shaft, and actuable to rotate the threaded shaft; a weight threadedly carried by the shaft and engageable with the stop portion to constrain the bracket against rotation with the shaft whereby the weight is movable along the length of the shaft upon actuation of the motor.

15. A film magazine according to claim 12 and including light tight covering means overlying the crossover opening and defining a crossover space, and wherein the light tight covering means includes a light tight film passage for film to enter the crossover space for travel through the crossover opening.

16. In combination with a spherical housing having a lens window; and a camera located in the housing and adjustable toward and away from the lens window along a predetermined linearly directed camera path, the camera including mounting means and a film compartment, an improved film magazine comprising:

a film casing mounted in a fixed position within the housing and having an elongated linearly directed film slot parallel to the camera path;

film guide means carried by the film casing for guiding film through the film slot for travel between the film casing and the film compartment of the camera, the film guide means including mounting means connected to the mounting means of the camera, the film guide means being linearly movable fore and aft along the length of the film slot in common with the camera to adjust the position of the camera relative to the lens window; and light tight means coupled between the film guide means and the film casing, and overlying the film slot in all fore and aft positions of the film guide means to shield from light film traveling between the film casing and the film compartment of the camera.

* * * * *